US012806589B2

(12) United States Patent
Wilson

(10) Patent No.: US 12,806,589 B2
(45) Date of Patent: Nov. 24, 2026

(54) MIXING CONTAINERS AND METHODS OF USE THEREOF

(71) Applicant: Brandon W. Wilson, Westfield, IN (US)

(72) Inventor: Brandon W. Wilson, Westfield, IN (US)

(73) Assignee: Conerstone Minds LLC, Westfield, IN (US)

( * ) Notice: Subject to any disclaimer, the term of this patent is extended or adjusted under 35 U.S.C. 154(b) by 503 days.

(21) Appl. No.: 18/289,334

(22) PCT Filed: Jun. 21, 2022

(86) PCT No.: PCT/US2022/034206

§ 371 (c)(1),
(2) Date: Nov. 2, 2023

(87) PCT Pub. No.: WO2022/271609

PCT Pub. Date: Dec. 29, 2022

(65) Prior Publication Data

US 2024/0367126 A1 Nov. 7, 2024

Related U.S. Application Data

(60) Provisional application No. 63/213,619, filed on Jun. 22, 2021.

(51) Int. Cl.
*B01F 35/00* (2022.01)
*A47J 43/27* (2006.01)
(Continued)

(52) U.S. Cl.
CPC ......... *B01F 35/32021* (2022.01); *A47J 43/27* (2013.01); *B01F 23/50* (2022.01);
(Continued)

(58) Field of Classification Search
CPC ........... B01F 35/32021; B01F 33/50111; A47J 43/27
See application file for complete search history.

(56) References Cited

U.S. PATENT DOCUMENTS 5,358,330 A * 10/1994 Moll .................. B01F 25/4523
215/DIG. 8
9,161,663 B1 10/2015 LeBlanc et al.
(Continued)

FOREIGN PATENT DOCUMENTS

CN 110338615 A 10/2019

OTHER PUBLICATIONS

International Searching Authority, International Search Report, PCT/US2022/034206, Dated Oct. 5, 2022.
(Continued)

*Primary Examiner* — Anshu Bhatia
(74) *Attorney, Agent, or Firm* — Reichel Stohry Dean LLP; Mark C. Reichel; Natalie J. Dean

(57) ABSTRACT

Mixing containers and methods of use thereof. An exemplary container described herein comprises a first layer comprising two first internal bars, said two internal bars parallel or substantially parallel to one another, a second layer comprising two second internal bars, said two second internal bars parallel or substantially parallel to one another and perpendicular or substantially perpendicular to said two first internal bars, whereby said first layer is positioned above said second layer within said container.

10 Claims, 16 Drawing Sheets

(51) Int. Cl.
*B01F 23/50* (2022.01)
*B01F 33/501* (2022.01)
*B01F 35/32* (2022.01)
*B01F 35/53* (2022.01)
*B01F 101/14* (2022.01)

(52) U.S. Cl.
CPC ...... *B01F 33/50111* (2022.01); *B01F 35/531* (2022.01); *B01F 2101/14* (2022.01)

(56) References Cited

U.S. PATENT DOCUMENTS

| | | | |
|---|---|---|---|
| 10,421,595 | B2 | 9/2019 | Wondka |
| D871,124 | S | 12/2019 | Winn et al. |
| 2019/0297921 | A1 | 10/2019 | Roberts |

OTHER PUBLICATIONS

International Searching Authority, Written Opinion of the International Searching Authority, PCT/US2022/034206, Dated Oct. 5, 2022.

* cited by examiner

MIXING CONTAINERS AND METHODS OF USE THEREOF

PRIORITY

The present application is related to, and claims the priority benefit of, U.S. Provisional Patent Application Ser. No. 63/213,619, filed Jun. 22, 2021, the contents of which are incorporated herein directly and by reference in their entirety.

BACKGROUND

Various containers, such as those referred to as "shaker bottles," are commonly used to mix one or more liquids with one more solids, such as, for example, mixing water or milk with protein powder. If such a shaker bottle, when capped and shaken with said ingredients therein, does not have any internal features to facilitate the mixing of ingredients, shaking said bottle would be time consuming and likely not result in a good dispersal of ingredients.

Attempts have been made to produce shaker bottles having features to optimize mixing, such as those including internal protrusions, grids, vortexes, and the like. Said bottles are not optimized for mixing as clumps of powder within the liquid can get caught within said grids or vortexes, or just bounce off of internal protrusions. As such, an optimized shaker bottle configured for effective and efficient mixing of liquids and solids therein would be well received in the marketplace.

BRIEF SUMMARY

The present disclosure includes disclosure of various embodiments of beverage containers, which can also be referred to as "shaker bottles" or other containers that are used to mix one or more liquids with one more solids, including, but not limited to, protein powder, fiber powder, meal replacement powder, and the like.

The present disclosure includes disclosure of a container, comprising a first layer comprising two first internal bars, said two internal bars parallel or substantially parallel to one another, a second layer comprising two second internal bars, said two second internal bars parallel or substantially parallel to one another and perpendicular or substantially perpendicular to said two first internal bars, whereby said first layer is positioned above said second layer within said container.

The present disclosure includes disclosure of a container, wherein when a powder and a liquid are positioned within the container when the container is closed, a user can shake said container to mix the powder and the liquid.

The present disclosure includes disclosure of a container, not comprising a mesh.

The present disclosure includes disclosure of a container, wherein the two first internal bars to not cross one another, and wherein the two second internal bars do not cross one another.

The present disclosure includes disclosure of a container, wherein the first layer comprises a first mixing ring, said first mixing ring having said two first internal bars as part of said first mixing ring.

The present disclosure includes disclosure of a container, wherein the second layer comprises a second mixing ring, said second mixing ring having said two second internal bars as part of said second mixing ring.

The present disclosure includes disclosure of a container, wherein a perimeter of the first mixing ring is larger than a perimeter of the second mixing ring.

The present disclosure includes disclosure of a container, wherein the perimeter of the first mixing ring has a first alignment key defined therein, said first alignment key in a first position relative to said two first internal bars, and wherein the perimeter of the second mixing ring has a second alignment key defined therein, said second alignment key in a second position relative to said two second internal bars, the first position being ninety degrees relative to the second position.

The present disclosure includes disclosure of a container, said container defining a container alignment key corresponding to the first alignment key and the second alignment key, wherein the second mixing ring can be positioned within the container with the second alignment key aligning with the container alignment key, and wherein the first mixing ring can be positioned within the container with the first alignment key aligned with the container alignment key, such that the first mixing ring is positioned above the second mixing ring, and such that the two first internal bars are perpendicular or substantially perpendicular to the two second internal bars.

The present disclosure includes disclosure of a container, defining a first shelf flange and a second shelf flange, the first shelf flange configured to receive the first mixing ring thereon, and the second shelf flange configured to receive the second mixing ring thereon.

The present disclosure includes disclosure of a container, wherein the two first internal bars and the two second internal bars each define a rectangular cross-section with rounded corners.

The present disclosure includes disclosure of a container, wherein the first layer further comprises a third first internal bar parallel or substantially parallel to the two first internal bars.

The present disclosure includes disclosure of a container, wherein the second layer further comprises a third second internal bar parallel or substantially parallel to the two second internal bars.

The present disclosure includes disclosure of a container, wherein one bar of said two first internal bars is positioned at a diameter of the container at the first layer, and wherein one bar of said two second internal bars is positioned at a diameter of the container at the second layer.

The present disclosure includes disclosure of a container, configured to receive a lid or cap configured to close said container when said lid or cap is positioned upon said container.

The present disclosure includes disclosure of a container, wherein a distance between a first bar and a second bar of said two first internal bars is equal or substantially equal to a distance between the second bar of said two first internal bars and a first perimeter of the container.

The present disclosure includes disclosure of a container, wherein a distance between a first bar and a second bar of said two second internal bars is equal or substantially equal to a distance between the second bar of said two second internal bars and a second perimeter of the container, the first perimeter being different than the second perimeter.

The present disclosure includes disclosure of a container, wherein the first layer exists within a first plane, and wherein the second layer exists within a second plane parallel to the first plane.

The present disclosure includes disclosure of a container, comprising a first layer comprising a first mixing ring comprising two first internal bars, said two first internal bars parallel or substantially parallel to one another, and a second layer comprising a second mixing ring comprising two second internal bars, said two second internal bars parallel or substantially parallel to one another and perpendicular or substantially perpendicular to said two first internal bars, wherein said first layer is positioned above said second layer within said container, wherein a perimeter of the first mixing ring is larger than a perimeter of the second mixing ring, wherein the perimeter of the first mixing ring has a first alignment key defined therein, said first alignment key in a first position relative to said two first internal bars, wherein the perimeter of the second mixing ring has a second alignment key defined therein, said second alignment key in a second position relative to said two second internal bars, the first position being ninety degrees relative to the second position, wherein said container defines a container alignment key corresponding to the first alignment key and the second alignment key, wherein the second mixing ring can be positioned within the container with the second alignment key aligning with the container alignment key, wherein the first mixing ring can be positioned within the container with the first alignment key aligned with the container alignment key, such that the first mixing ring is positioned above the second mixing ring, and such that the two first internal bars are perpendicular or substantially perpendicular to the two second internal bars, wherein the container defines a first shelf flange and a second shelf flange, the first shelf flange configured to receive the first mixing ring thereon, and the second shelf flange configured to receive the second mixing ring thereon, wherein when a powder and a liquid are positioned within the container when the container is closed, a user can shake said container to mix the powder and the liquid, and wherein said container does not comprise a mesh therein.

The present disclosure includes disclosure of a container, wherein the two first internal bars and the two second internal bars each define a rectangular cross-section with rounded corners, wherein one bar of said two first internal bars is positioned at a diameter of the container at the first layer, and wherein one bar of said two second internal bars is positioned at a diameter of the container at the second layer.

Other embodiments are described in detail herein.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein.

Figure 1:
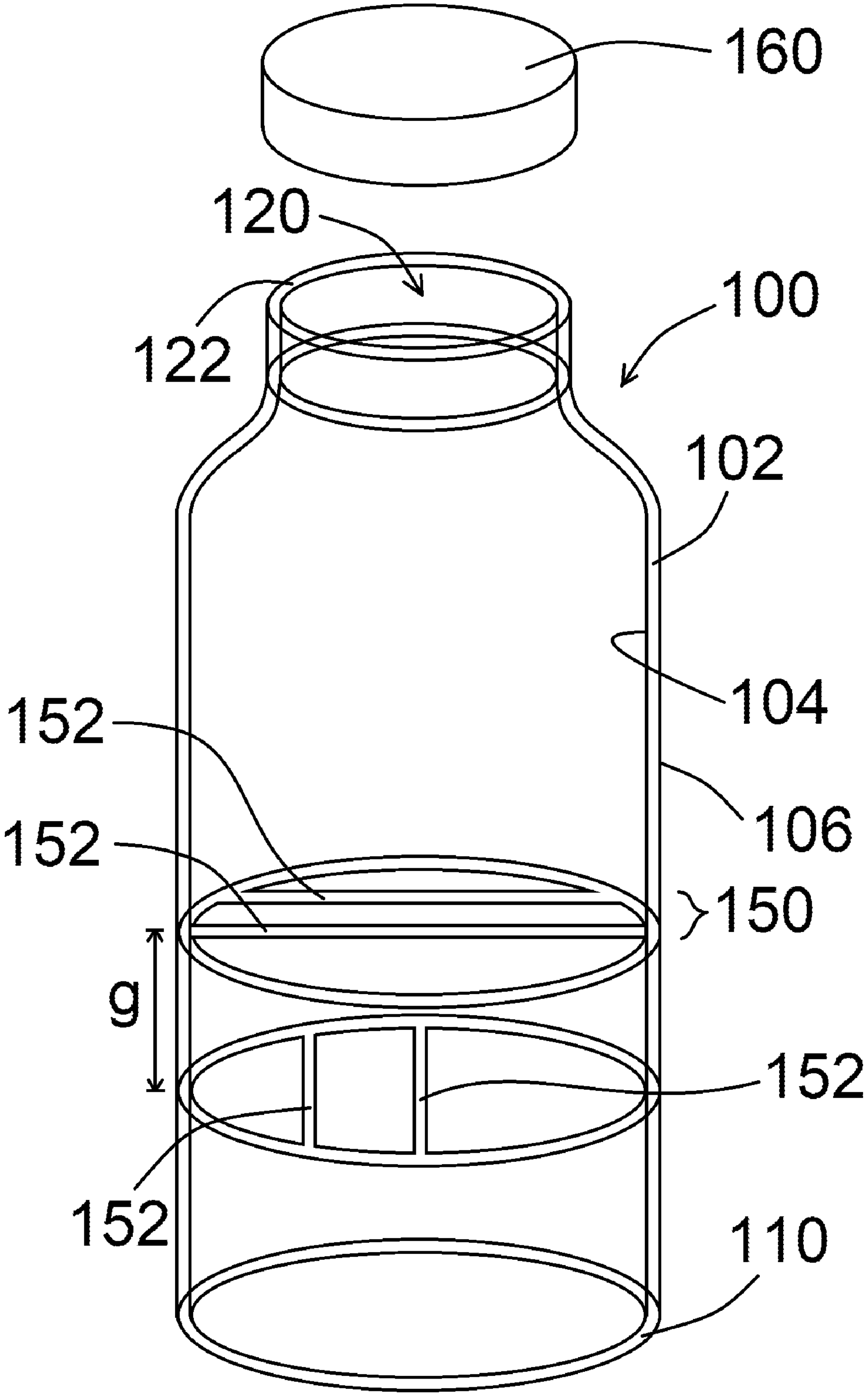
FIG. 1 shows a perspective relative internal view of a container, according to an exemplary embodiment of the present disclosure.

As such, an overview of the features, functions and/or configurations of the components depicted in the various figures will now be presented. It should be appreciated that not all of the features of the components of the figures are necessarily described and some of these non-discussed features (as well as discussed features) are inherent from the figures themselves. Other non-discussed features may be inherent in component geometry and/or configuration. Furthermore, wherever feasible and convenient, like reference numerals are used in the figures and the description to refer to the same or like parts or steps. The figures are in a simplified form and not to precise scale.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present disclosure includes disclosure of various embodiments of beverage containers, which can also be referred to as "shaker bottles" or other containers that are used to mix one or more liquids with one more solids, including, but not limited to, protein powder, fiber powder, meal replacement powder, and the like.

An exemplary container of the present disclosure is shown in FIG. 1. As shown in FIG. 1, an exemplary container 100 comprises a sidewall 102 having an inner surface 104 and an outer surface 106, whereby sidewall 102 is adjacent to a relative bottom 110 of said container 100. Such a configuration would therefore define a container opening 120 at a relative top 122 of said container 100, noting that such an opening 120 can have any number of configurations as referenced in further detail herein.

Containers 100 of the present disclosure comprise one or more blending features 150, which, as described herein, generally comprise at least two, and preferably four, internal bars 152 that do not form a planar grid. For example, and as shown in FIG. 1, an exemplary container 100 of the present disclosure can comprise two internal bars 152 aligned in a first relative lateral direction and two additional internal bars 152 aligned in a second relative lateral direction different from the first relative lateral direction and further aligned in a different plane as compared to the first two internal bars 152.

As shown in FIG. 1, one of the first two internal bars 152 (the "first plane first bar 152," depicted as internal bar 152*a* in FIG. 1) can extend across a widest point of container 100, such as extending across the inner diameter of container 100 or substantially across the inner diameter of container 100. The other of the first two internal bars 152 (the first plane second bar 152," depicted as internal bar 152*b* in FIG. 1) can lie on the same horizontal plane as first plane first bar 152 (internal bar 152*a*, which extends fully or substantially across the inner diameter of container 100), being positioned in a relative middle of the space on one side of first plane first bar 152 (internal bar 152*a*) and inner surface 104 of sidewall 102 of container 100. One of the second two internal bars 152 (the "second plane first bar 152," depicted as internal bar 152*c* in FIG. 1) can extend across a widest point of container 100, such as extending across the inner diameter of container 100 or substantially across the inner diameter of container 100, but perpendicular to first plane first bar 152 (internal bar 152*a*). The other of the second two internal bars 152 (the "second plane second bar 152," depicted as internal bar 152*d* in FIG. 1) can lie on the same horizontal plane as second plane first bar 152 (internal bar 152*c*, which extends fully or substantially across the inner diameter of container 100), being positioned in a relative middle of the space on one side of second plane first bar 152 (internal bar 152*c*) and inner surface 104 of sidewall 102 of container 100.

Figure 2:
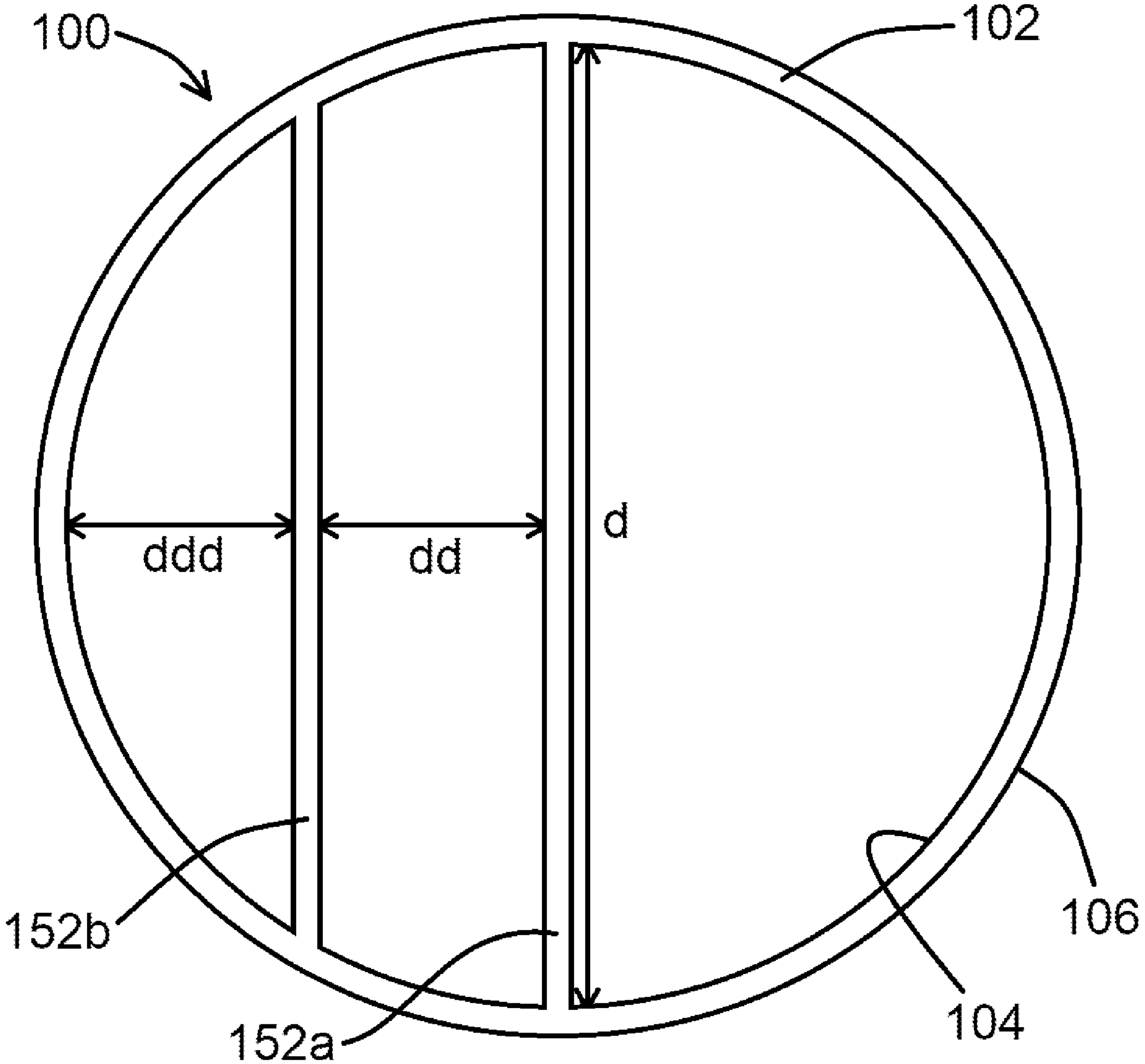
FIG. 2 shows a top view of a portion of a cross-section of an internal mixing feature of a container, according to an exemplary embodiment of the present disclosure.
Figure 3:
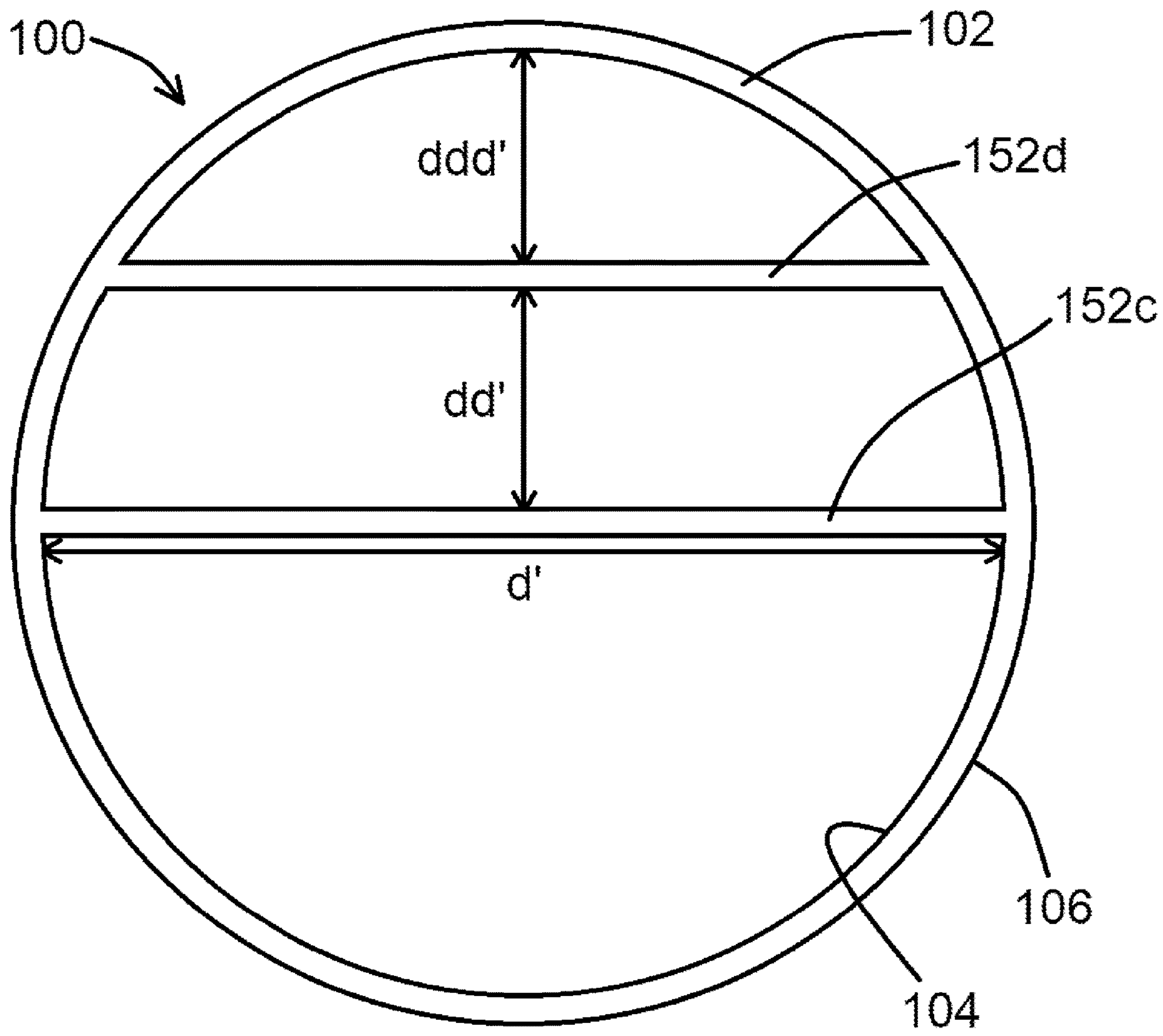
FIG. 3 shows another top view of a portion of a cross-section of an internal mixing feature of a container, according to an exemplary embodiment of the present disclosure.

Such an exemplary configuration of internal bars 152 is shown in FIGS. 2 and 3. As shown in FIG. 2, which depicts a top-down view of a cross-section layer of an exemplary container 100 of the present disclosure, two internal bars 152 are positioned consistent with internal bar 152*a* and internal bar 152*b* depicted in FIG. 1 and described herein. Internal bar 152*a* extends across the inner diameter of container 100 (identified as the distance d in the figure) or substantially across the inner diameter of container 100. Internal bar 152*b* can lie on the same horizontal plane as internal bar 152*a*, such as whereby internal bar 152*b* is positioned in a relative middle of the space on one side of internal bar 152*a* and inner surface 104 of sidewall 102 of container 100. This is depicted in FIG. 2 by way of distance dd and distance ddd in the figure, whereby distance dd and distance ddd are the same distance or substantially the same distance.

FIG. 3, which also depicts a top-down view of a cross-section layer of an exemplary container 100 of the present disclosure, two internal bars 152 are positioned consistent with internal bar 152*c* and internal bar 152*d* depicted in FIG. 1 and described herein. Internal bar 152*c* extends across the inner diameter of container 100 (identified as the distance d' in the figure) or substantially across the inner diameter of container 100, but perpendicular or substantially perpendicular to internal bar 152*a* shown in FIG. 2. Internal bar 152*d* can lie on the same horizontal plane as internal bar 152*c*, such as whereby internal bar 152*d* is positioned in a relative middle of the space on one side of internal bar 152*c* and inner surface 104 of sidewall 102 of container 100. This is depicted in FIG. 2 by way of distance dd' and distance ddd' in the figure, whereby distance dd' and distance ddd' are the same distance or substantially the same distance.

Figure 6:
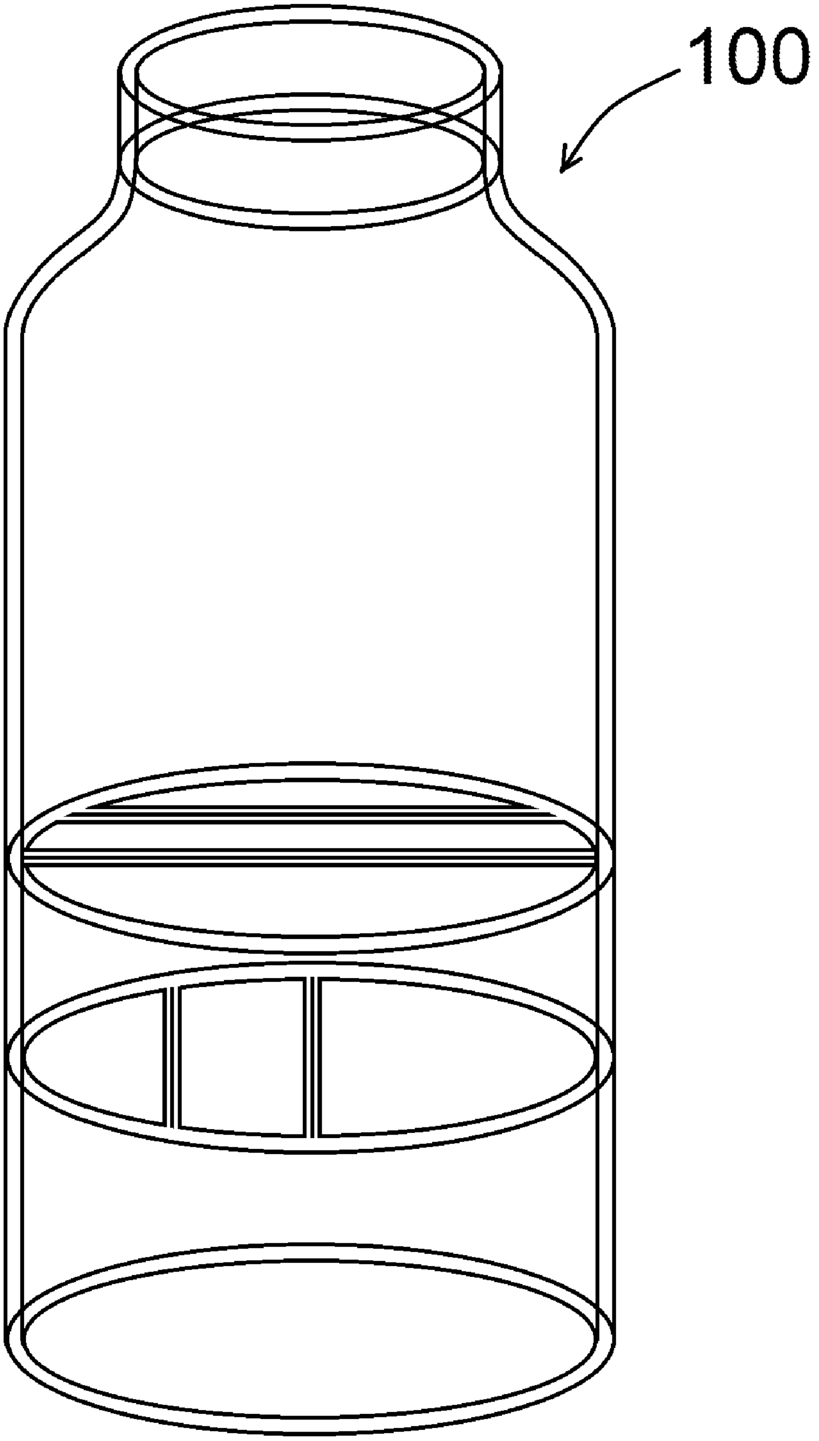
FIG. 6 shows a perspective relative internal view of a container having diamond shaped/profiled internal bars, according to an exemplary embodiment of the present disclosure.
Figure 17:
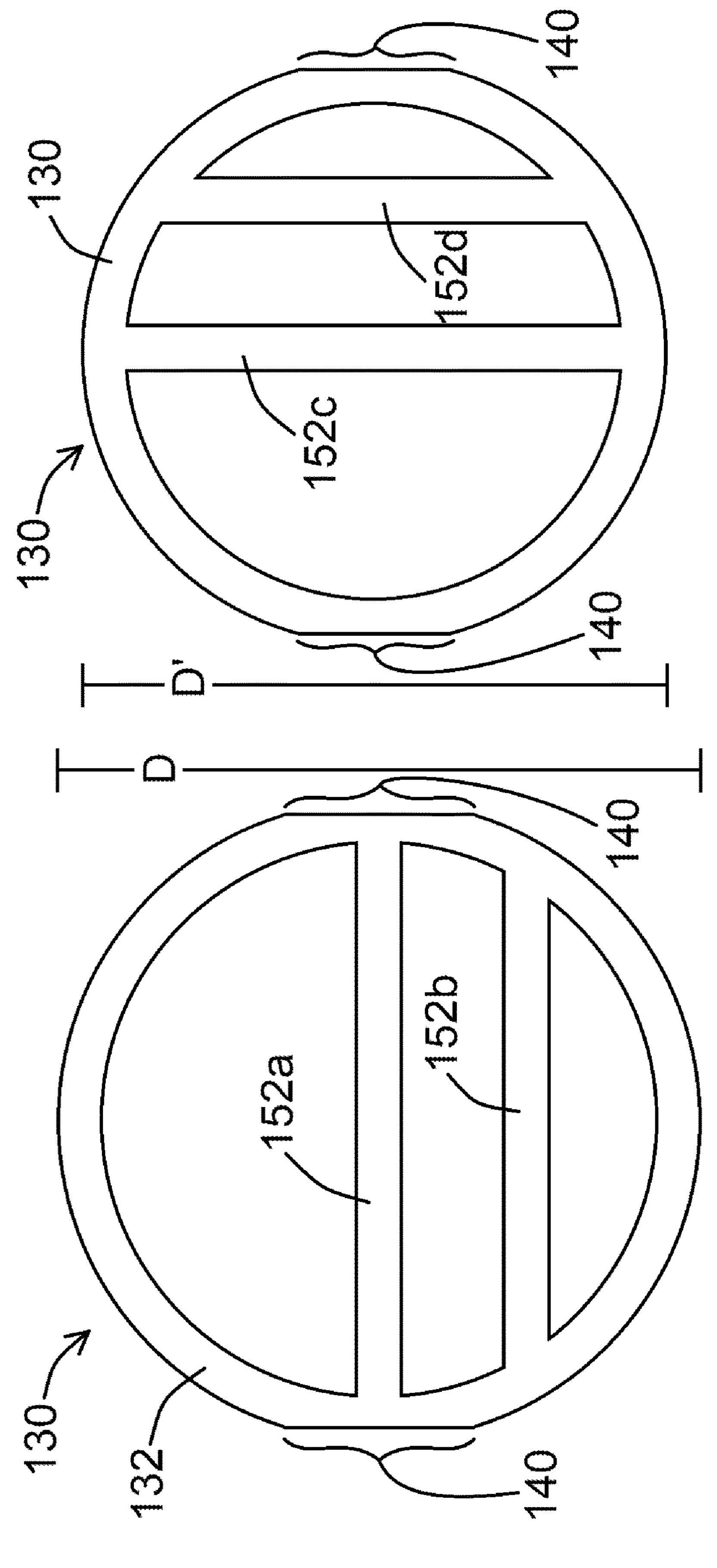
FIG. 17 shows top views of two exemplary mixing rings, according to an exemplary embodiments of the present disclosure.

FIGS. 2 and 3 also depict exemplary blending features 150 configured as individual elements configured to fit within a container to form an exemplary container 100 of the present disclosure. For example, FIGS. 2 and 3 can each be considered to depict a mixing ring 130, each mixing ring having two internal bars 152*a*, 152*b* (as shown in FIG. 2) and 152*c*, 152*d* (as shown in FIG. 3). Said mixing rings 130 can be positioned one above another so that internal bars 152*a*, 152*b* are perpendicular or substantially perpendicular to internal bars 152*c*, 152*d*, such as shown in FIG. 6. Additional mixing ring 130 embodiments are also shown in FIG. 17, described in further detail herein.

Figure 4:
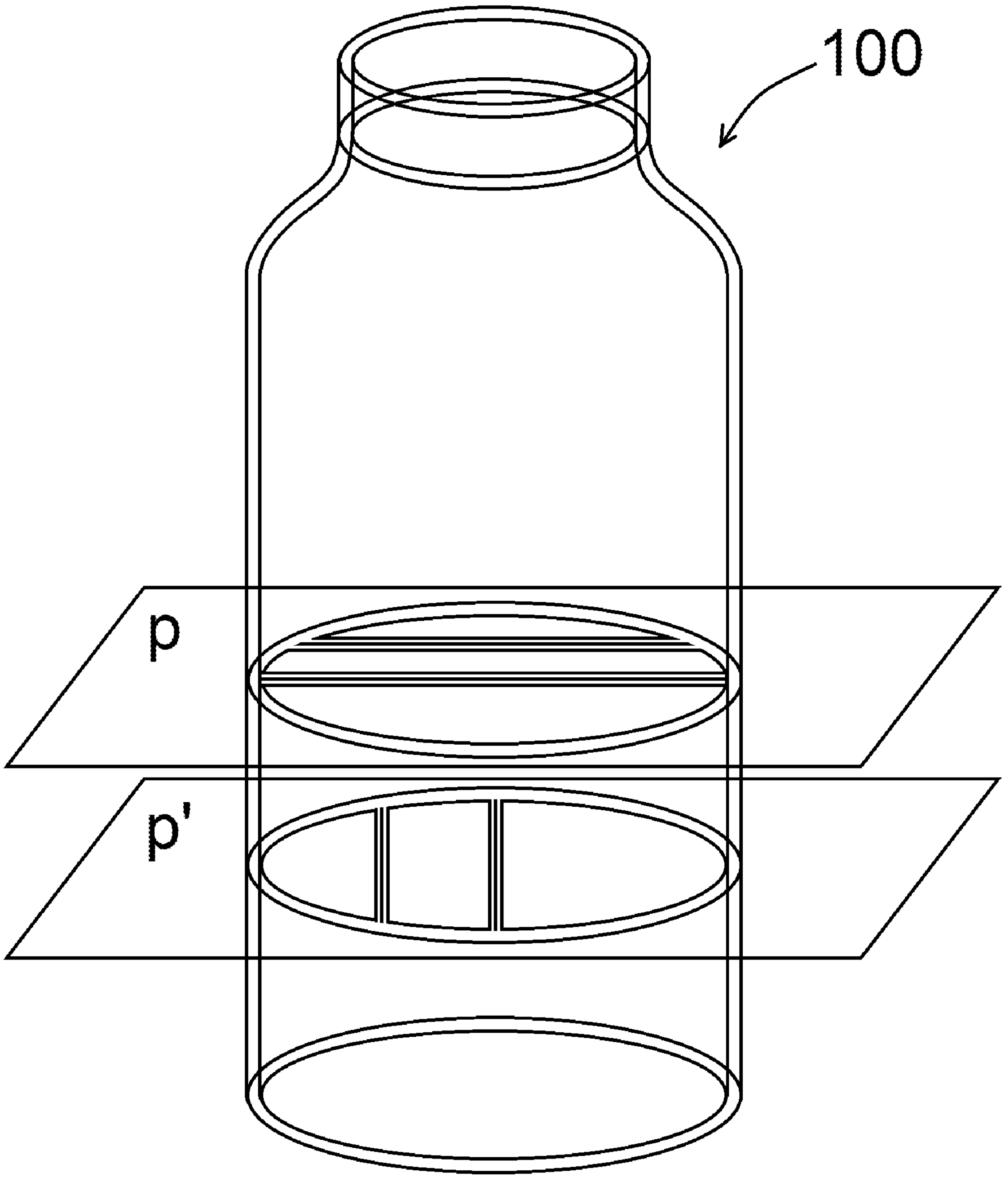
FIG. 4 shows a perspective relative internal view of a container with two horizontal planes depicted therein, according to an exemplary embodiment of the present disclosure.

As shown in FIG. 1, the individual layers of internal bars 152 shown in FIG. 2 and FIG. 3 form their own horizontal or substantially horizontal planes, one above the other. FIG. 4 depicts the two planes (p and p') to demonstrate that the layers of internal bars 152 shown in FIG. 2 and FIG. 3 are indeed individual layers. As such, embodiments of the present disclosure do not include any sort of grid, defined as multiple lines crossing one another on the same plane.

Figure 5:
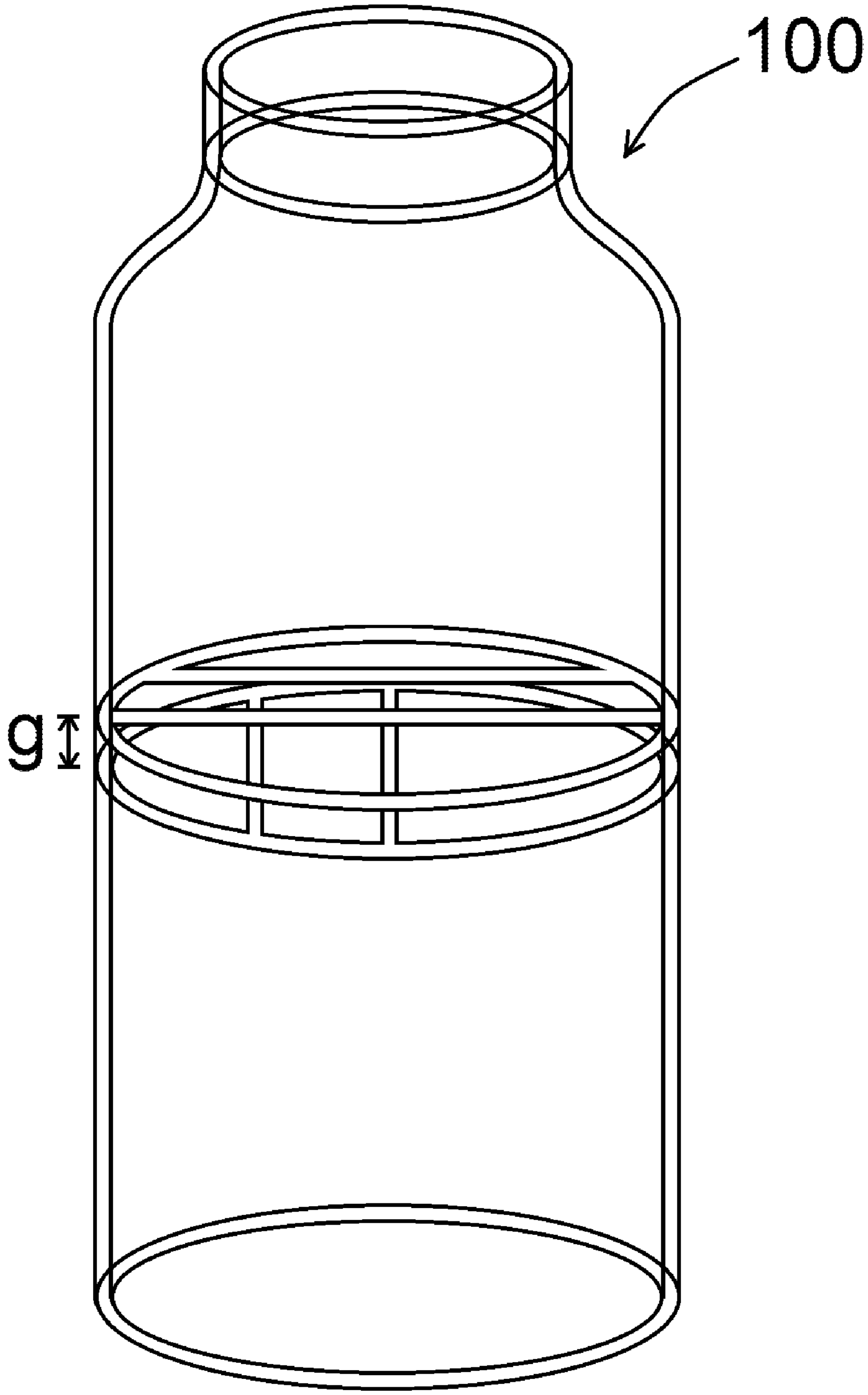
FIG. 5 shows a perspective relative internal view of a container having two layers of internal bars relatively close to one another, according to an exemplary embodiment of the present disclosure.

As shown in FIG. 5, as compared to FIG. 1, the gap (g) between the layers of internal bars 152 can vary, such as being relatively close to one another, as shown in FIG. 5, or relative far from one another, as shown in FIG. 1. An exemplary gap can be 1.5", 1.0", 0.5", or smaller or larger, as may be desired.

Figure 7:
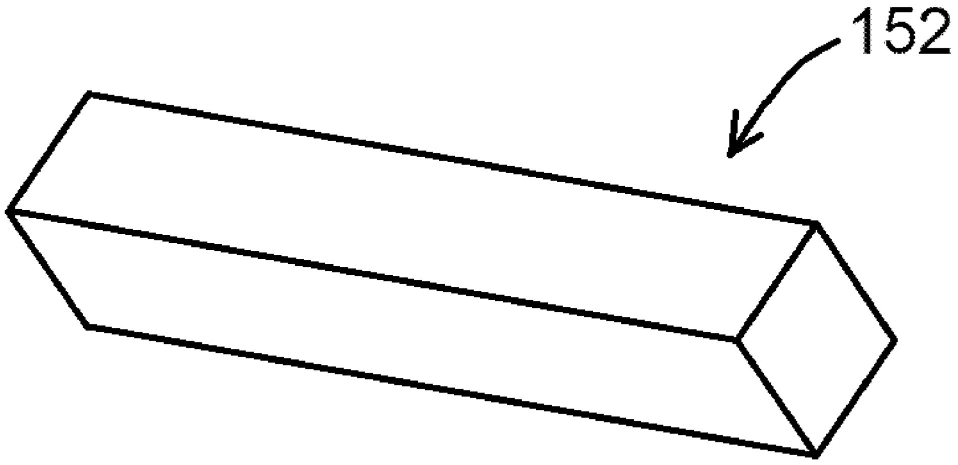
FIG. 7 shows a perspective view of an internal bar of the present disclosure having a diamond shape/profile, according to an exemplary embodiment of the present disclosure.
Figure 8:
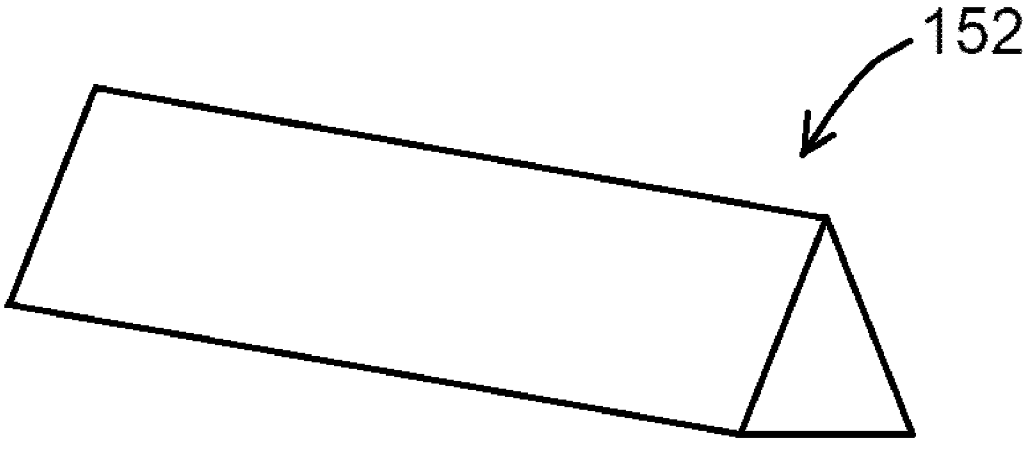
FIG. 8 shows a perspective view of an internal bar of the present disclosure having a triangular/triangle shape/profile, according to an exemplary embodiment of the present disclosure.
Figure 9:
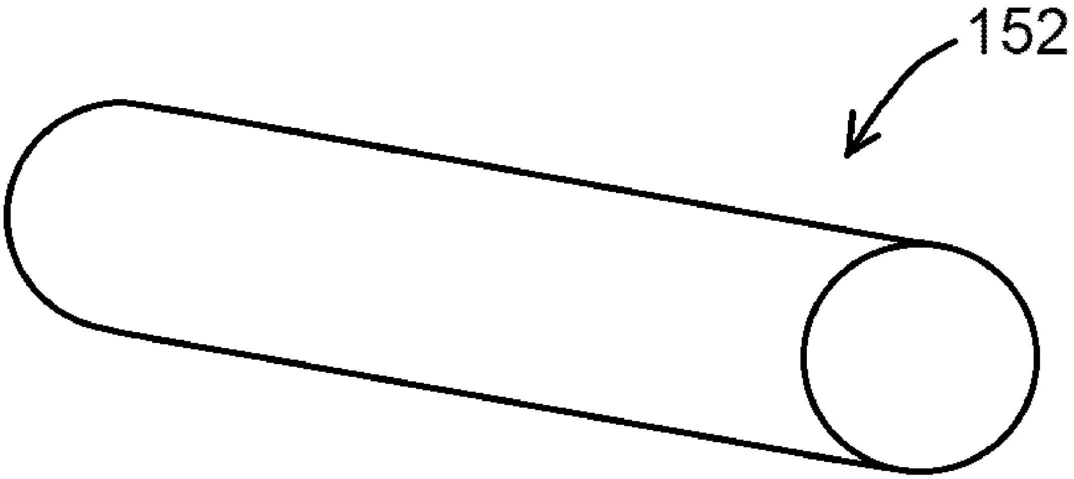
FIG. 9 shows a perspective view of an internal bar of the present disclosure having a circular/round shape/profile, according to an exemplary embodiment of the present disclosure.
Figure 10:
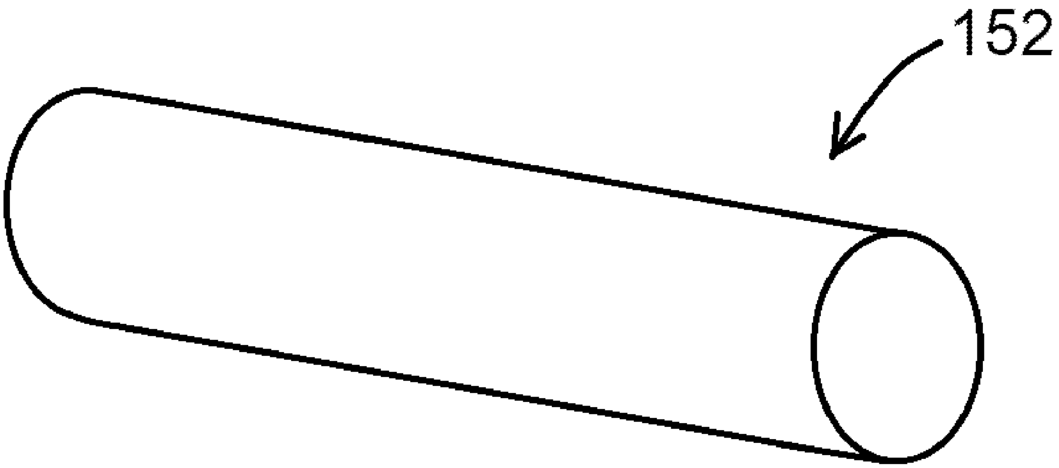
FIG. 10 shows a perspective view of an internal bar of the present disclosure having a ovular/oval shape/profile, according to an exemplary embodiment of the present disclosure.

FIG. 6 differs from FIG. 1 with respect to the shape/profiles of the individual bars 152. In a preferred embodiment, a shape/profile of an exemplary internal bar 152 of the present disclosure is a diamond shape, forming an elongated diamond-shaped internal bar 152, such as shown in FIG. 7. Said diamond shape is optimal as it facilitates dispersal of a powder within a liquid inside said container 100, as the diamond shape has corners on a relative top and bottom, whereby the powder would hit said corners when shaking container 100 up and down, and has two additional corners on each relative side of the diamond shaped internal bar 152, facilitating further dispersal when shaken. Other shapes/ profiles of exemplary internal bars 152 of the present disclosure can be used, such as triangular/triangle (FIG. 8), circular/round (FIG. 9), ovular/oval (FIG. 10), and the like.

Figure 18:
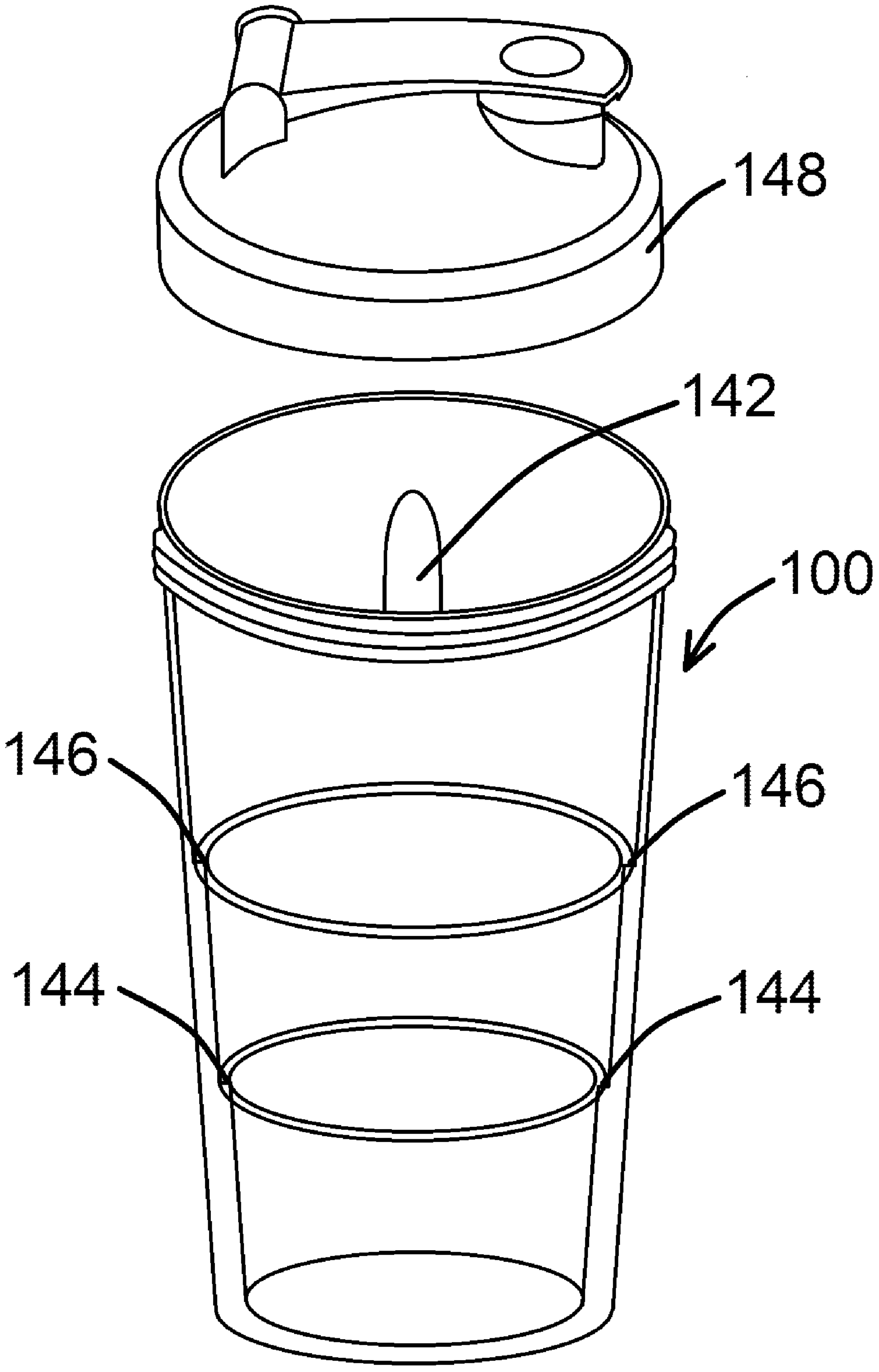
FIG. 18 shows a perspective transparent view of a container and a lid, the container configured to receive two exemplary mixing rings therein, according to an exemplary embodiment of the present disclosure.

As such, and in use, a user would add one or more liquids and one or more solids (powders and the like) into said container via opening 120, would cap/close said container using a cap 160 or lid 148 (as shown in FIG. 18) that is separate from or hingedly coupled to said container, and then shake said container 100 to effectively mix said contents.

Figure 11:
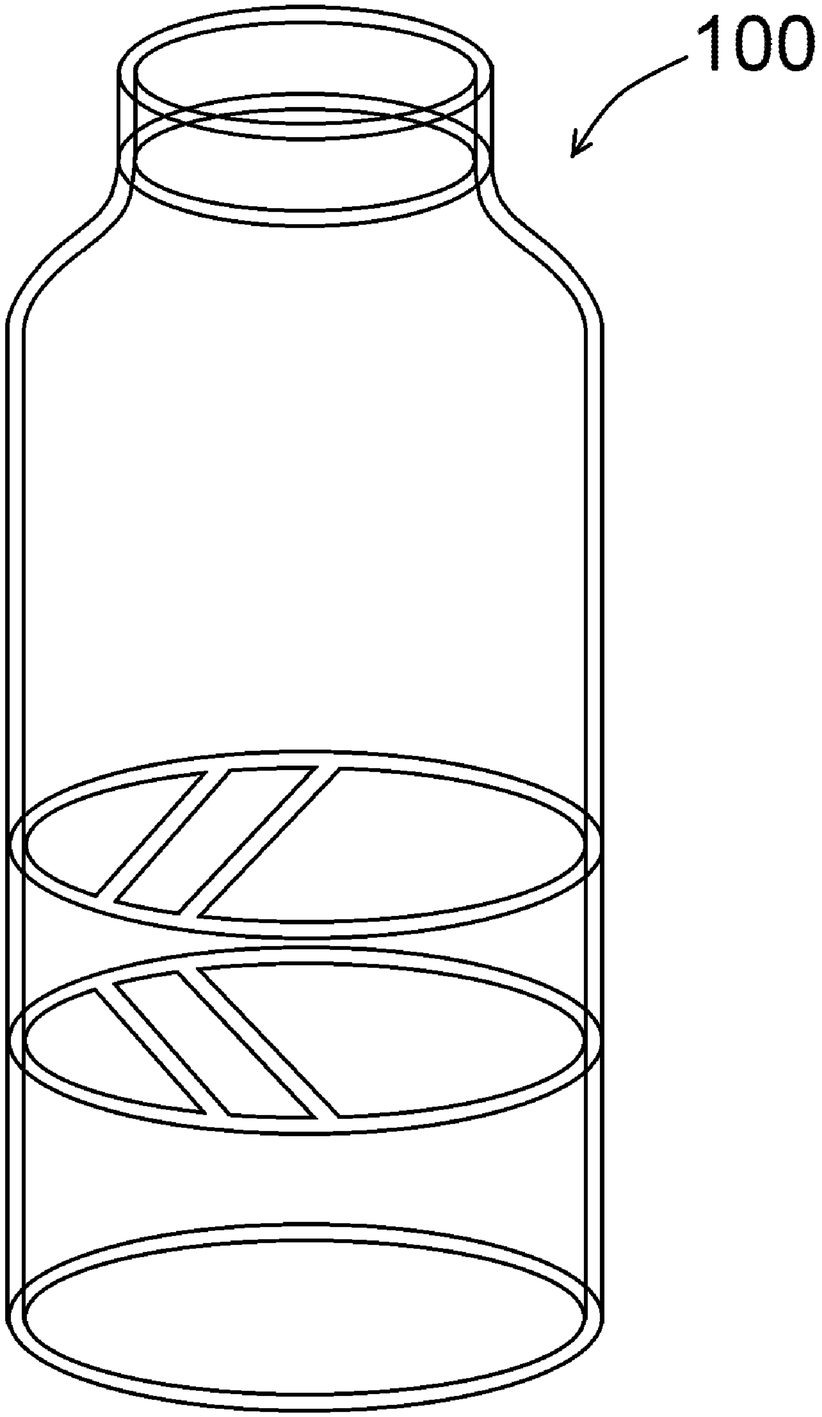
FIG. 11 shows a perspective relative internal view of a container with another exemplary internal bar configuration, according to an exemplary embodiment of the present disclosure.
Figure 12:
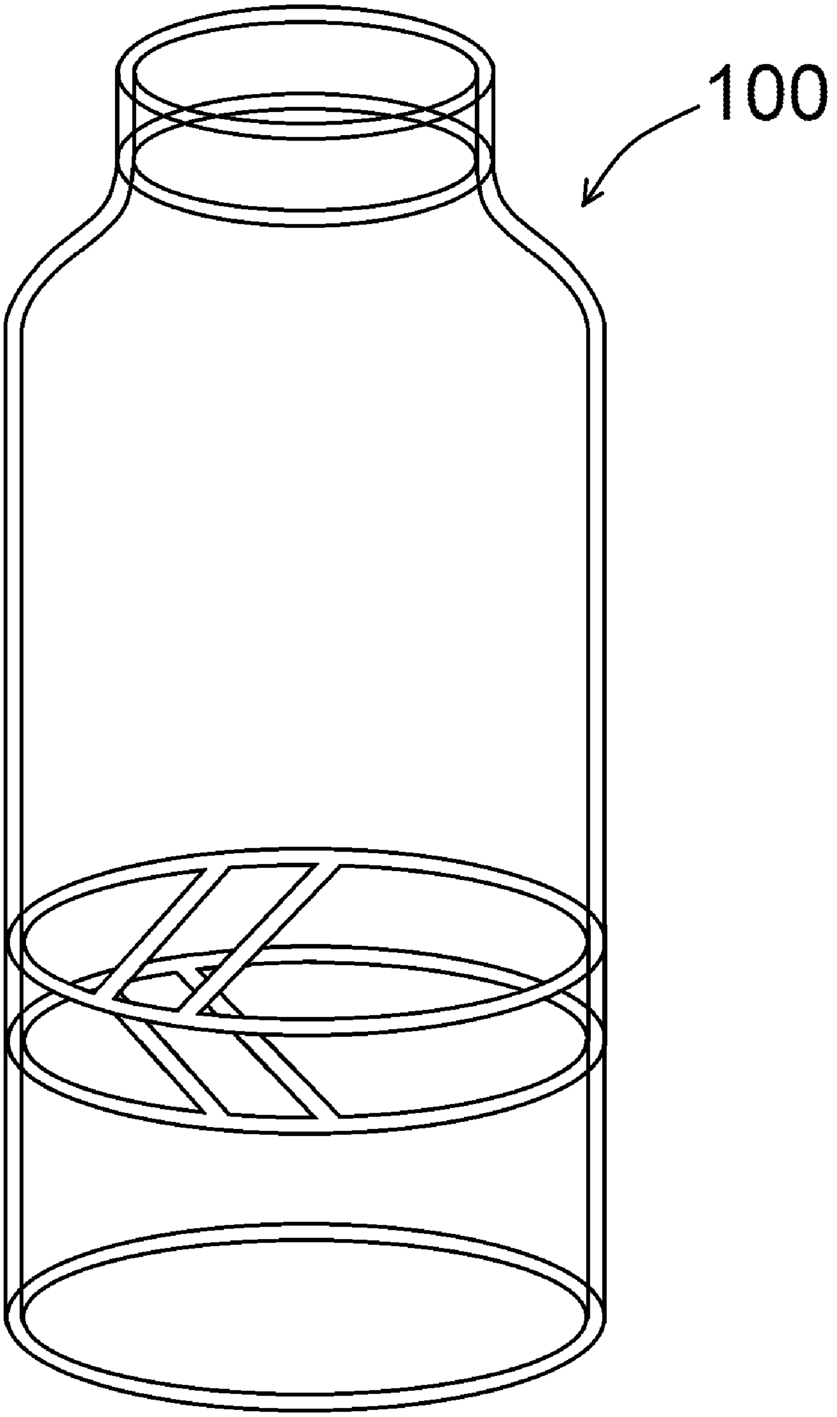
FIG. 12 shows a perspective relative internal view of a container having two layers of internal bars relatively close to one another, according to an exemplary embodiment of the present disclosure.

As shown in FIGS. 11 and 12, internal bars 152 can have different orientations as compared to those shown in FIGS. 1-6. For example, and as shown in FIGS. 11 and 12, the two layers of internal bars 152 can each comprise two internal bars 152 that are parallel or substantially parallel to one another, but not arranged as one bar 152 being at the relative diameter of container 100 and the other bar 152 being half-way between said bar 152 and an internal surface 104 of container 100. Furthermore, said layers of internal bars 152 do not need to have internal bars 152 that are relatively perpendicular to one another, such as shown in FIGS. 1-6, which do depict the perpendicular relative arrangement.

Figure 13:
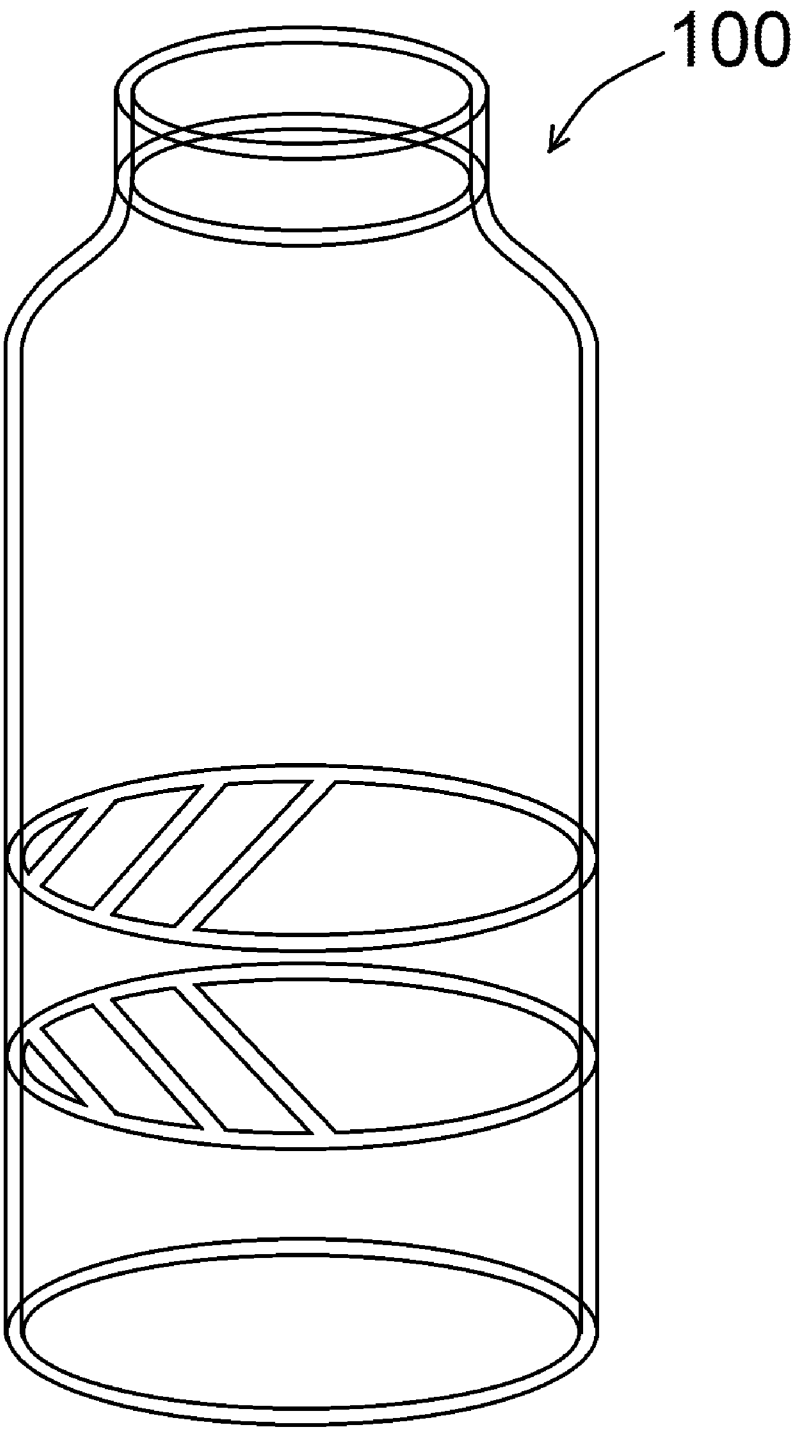
FIG. 13 shows a perspective relative internal view of a container having two layers of three internal bars each, according to an exemplary embodiment of the present disclosure.

FIG. 13 shows an additional embodiment of a container 100 of the present disclosure, whereby said container 100 comprises two layers of internal bars 152, and whereby each layer comprises three internal bars 152. As such, the present Application is not limited to the number of internal bars 152 per layer, but two or three internal bars 152 are preferred. Four, five, six, or more internal bars 152 could also be used per layer as desired.

Figure 14:
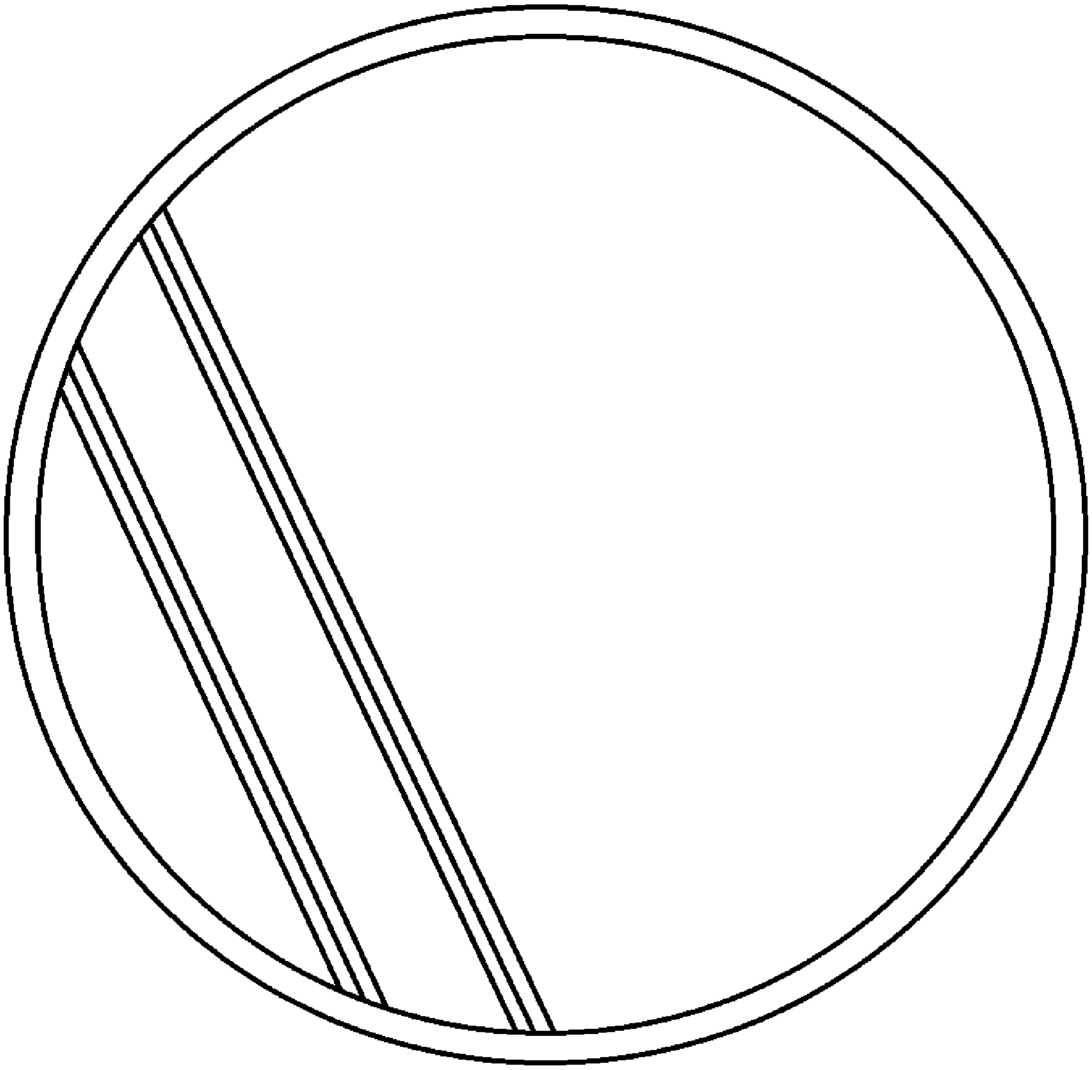
FIG. 14 shows a top view of a portion of a cross-section of an internal mixing feature of a container with an open quadrant highlighted with asterisks, according to an exemplary embodiment of the present disclosure.

FIG. 14 shows a top-down view of a cross-section layer of an exemplary container 100 of the present disclosure, whereby the two internal bars 152 form one of the two layers, and whereby the two internal bars 152 are not positioned within said container 100 consistent with FIGS. 1-6.

Figure 15:
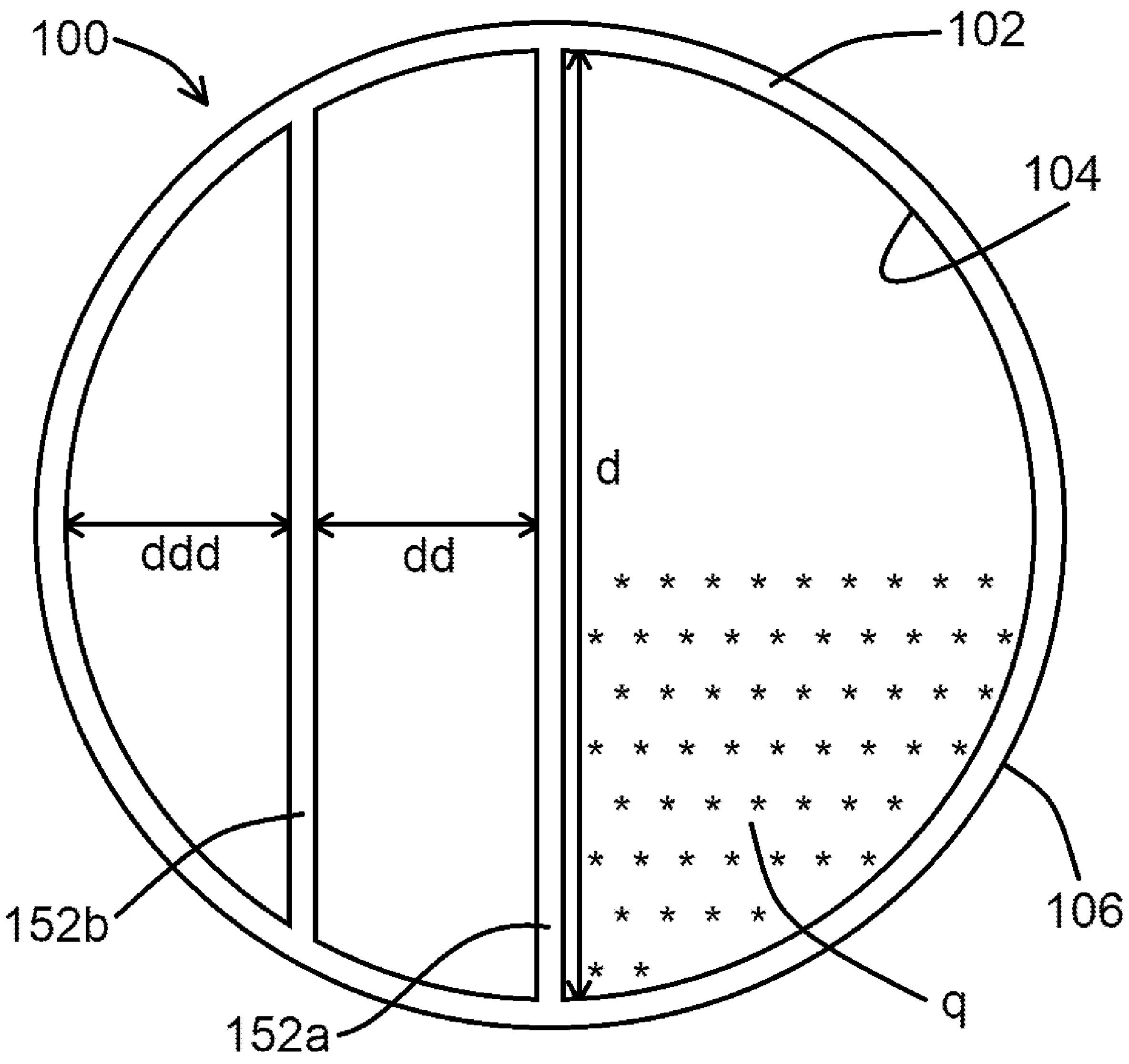
FIG. 15 shows another top view of a portion of a cross-section of an internal mixing feature of a container with an open quadrant highlighted with asterisks, according to an exemplary embodiment of the present disclosure.
Figure 16:
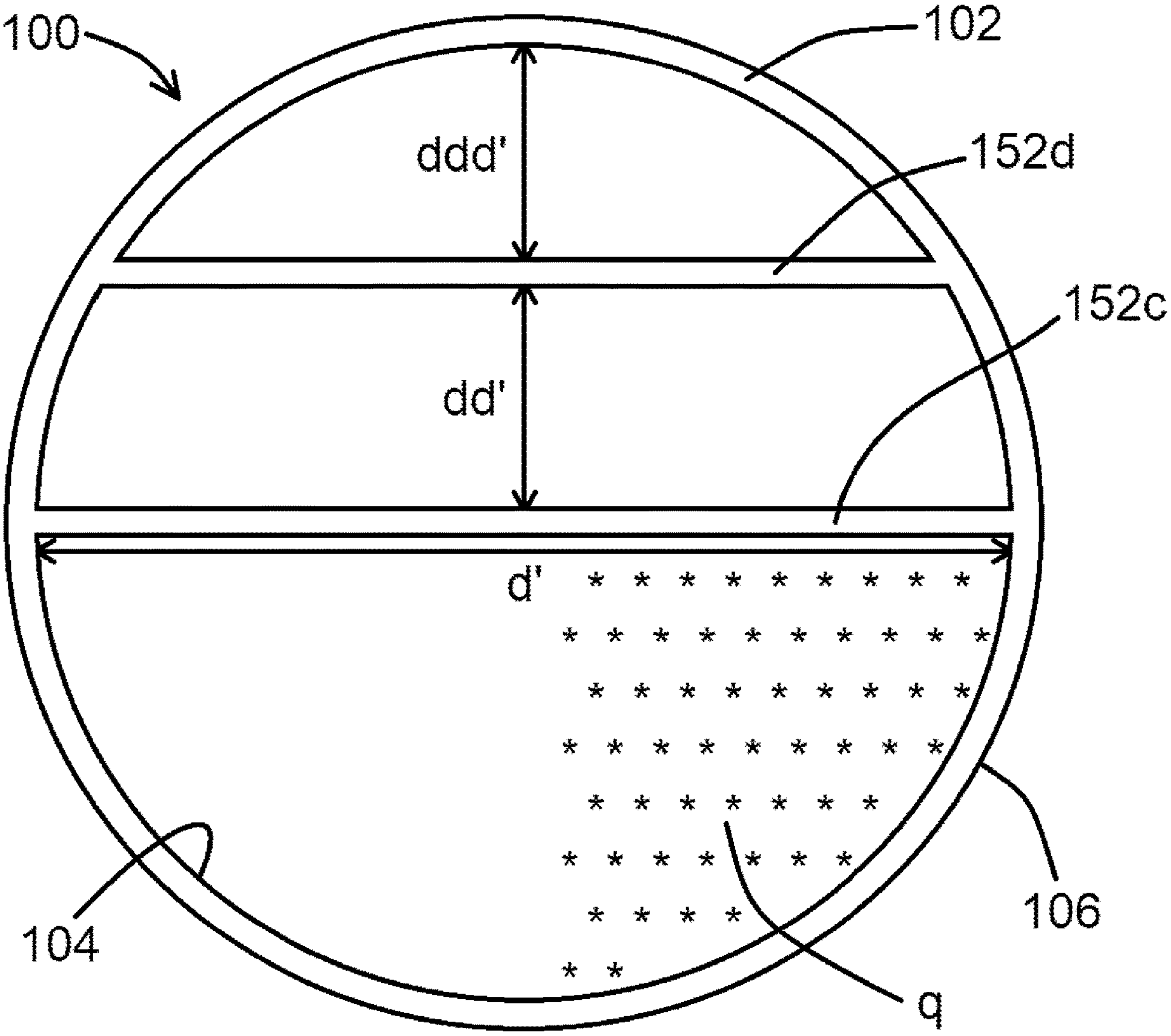
FIG. 16 shows another top view of a portion of a cross-section of an internal mixing feature of a container, according to an exemplary embodiment of the present disclosure.

FIGS. 15 and 16 mirror FIGS. 2 and 3, respectively, but for the addition of a series of asterisks within FIGS. 15 and 16, said asterisks representing a general quadrant q of the top-down views. For example, and should the cross-sectional layers of internal bars 152 of FIGS. 15 and 16 be used on top of one another within an exemplary container 100 of the present disclosure, such as shown in FIGS. 1 and 5, a quadrant q would be "open," meaning not having any internal bars 152 passing therethrough. Such an embodiment is preferred, as when a liquid and a powder is placed into a container 100 having said configuration, capped, and shaken, the open quadrant would allow for optimized liquid flow, while the other three quadrants occupied by internal bars 152 would be used to mix/agitate the powder to facilitate dispersal of said powder within said liquid.

FIG. 17 shows two embodiments of exemplary mixing rings 130 of the present disclosure. As shown therein, said mixing rings are different sizes (the mixing ring 130 on the left side has diameter D, while the mixing ring on the right side has a smaller diameter D'), with said embodiments useful in connection with the container 100 embodiment shown in FIG. 18. As shown in FIG. 17, each mixing ring 130 defines a perimeter structure and two internal bars 152, namely internal bar 152*a*, positioned at a relative diameter of the mixing ring 130 on the left side, internal bar 152*b*, positioned at or about halfway in between internal bar 152*a* and the adjacent perimeter structure of mixing ring 130, internal bar 152*c*, positioned at a relative diameter of the mixing ring 130 on the right side, and internal bar 152*d*, positioned at or about halfway in between internal bar 152*c* and the adjacent perimeter structure of mixing ring 130.

Mixing rings 130, as shown in FIG. 17, may be "keyed" in that they have one or more alignment keys 140 defined within the perimeter structure defined by said mixing rings 130. Alignment keys 140 are configured to align with one or more container alignment keys 142, such as shown in FIG. 18, whereby container alignment key 142 is a vertical flat portion inside an otherwise circular internal container portion. By having alignment keys 140 and container alignment keys 142 as shown (and other configurations of aligning keys 140, 142), the container ring 130 on the right side of FIG. 17 can first fit within container 100 shown in FIG. 18, with alignment keys 142 aligning with container alignment keys 142, and then the mixing ring 130 on the left side of FIG. 17 can be positioned within container 100, aligning said alignment keys 140 with container alignment keys 142.

Containers 100 may also be configured as shown in FIG. 18 with a first shelf flange 144 and/or a second shelf flange 146, each being flanges 144, 146 defined within an internal portion of said containers 100. First shelf flange 144 is configured to receive a first mixing ring 130 thereon, and the second shelf flange 146 is configured to receive a second mixing ring 130 thereon.

Procedurally, a user of an exemplary container 100 of the present disclosure can place liquid and powder within said container 100, close said container 100 (using a cap 160, as shown in FIG. 1, or lid 148, as shown in FIG. 18), and shake said container to effectively mix the liquid and powder.

Containers 100 can be configured with internal bars 152 by way of, for example, ultrasonic welding, whereby said internal bars 152 are secured to an internal surface 104 of sidewalls 102 of an exemplary container 100. The present Application is not limited to ultrasonic welded containers 100.

While various embodiments of mixing containers and methods for using the same have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A container, comprising:

a first layer comprising a first mixing ring comprising two first internal bars, said two first internal bars parallel or substantially parallel to one another; and a second layer comprising a second mixing ring comprising two second internal bars, said two second internal bars parallel or substantially parallel to one another and perpendicular or substantially perpendicular to said two first internal bars;

wherein said first layer is positioned above said second layer within said container;

wherein a perimeter of the first mixing ring is larger than a perimeter of the second mixing ring;

wherein the perimeter of the first mixing ring has a first alignment key defined therein, said first alignment key in a first position relative to said two first internal bars;

wherein the perimeter of the second mixing ring has a second alignment key defined therein, said second alignment key in a second position relative to said two second internal bars, the first position being ninety degrees relative to the second position;

wherein said container defines a container alignment key corresponding to the first alignment key and the second alignment key;

wherein the second mixing ring can be positioned within the container with the second alignment key aligning with the container alignment key;

wherein the first mixing ring can be positioned within the container with the first alignment key aligned with the container alignment key, such that the first mixing ring is positioned above the second mixing ring, and such that the two first internal bars are perpendicular or substantially perpendicular to the two second internal bars;

wherein the container defines a first shelf flange and a second shelf flange, the first shelf flange configured to receive the first mixing ring thereon, and the second shelf flange configured to receive the second mixing ring thereon;

wherein when a powder and a liquid are positioned within the container when the container is closed, a user can shake said container to mix the powder and the liquid; and wherein said container does not comprise a mesh therein.

2. The container of claim 1, wherein the two first internal bars and the two second internal bars each define a rectangular cross-section with rounded corners.

3. The container of claim 1, wherein the first layer further comprises a third first internal bar parallel or substantially parallel to the two first internal bars.

4. The container of claim 3, wherein the second layer further comprises a third second internal bar parallel or substantially parallel to the two second internal bars.

5. The container of claim 1, wherein one bar of said two first internal bars is positioned at a diameter of the container at the first layer, and wherein one bar of said two second internal bars is positioned at a diameter of the container at the second layer.

6. The container of claim 1, configured to receive a lid or cap configured to close said container when said lid or cap is positioned upon said container.

7. The container of claim 1, wherein a distance between a first bar and a second bar of said two first internal bars is equal or substantially equal to a distance between the second bar of said two first internal bars and a first perimeter of the container.

8. The container of claim 7, wherein a distance between a first bar and a second bar of said two second internal bars is equal or substantially equal to a distance between the second bar of said two second internal bars and a second perimeter of the container, the first perimeter being different than the second perimeter.

9. The container of claim 1, wherein the first layer exists within a first plane, and wherein the second layer exists within a second plane parallel to the first plane.

10. The container of claim 1, wherein the two first internal bars and the two second internal bars each define a rectangular cross-section with rounded corners, wherein one bar of said two first internal bars is positioned at a diameter of the container at the first layer, and wherein one bar of said two second internal bars is positioned at a diameter of the container at the second layer.

* * * * *